United States Patent
Weng et al.

(10) Patent No.: US 7,945,419 B2
(45) Date of Patent: May 17, 2011

(54) ELECTRONIC MEASUREMENT OF OFF-CENTER RUN-OUT AND REEL-HUB MISMATCH

(75) Inventors: Ming-chih Weng, Los Angeles, CA (US); Turguy Goker, Solana Beach, CA (US); James Mark Decot, Fountain Valley, CA (US); Minh Vu, Midway City, CA (US); John A. Hamming, San Clemente, CA (US)

(73) Assignee: Quantum Corporation, San Jose, CA (US)

( * ) Notice: Subject to any disclaimer, the term of this patent is extended or adjusted under 35 U.S.C. 154(b) by 240 days.

(21) Appl. No.: 12/191,823

(22) Filed: Aug. 14, 2008

(65) Prior Publication Data

US 2010/0042360 A1 Feb. 18, 2010

(51) Int. Cl.
*G01P 3/00* (2006.01)
*G11B 15/52* (2006.01)

(52) U.S. Cl. .................. 702/145; 702/142; 360/73.11; 360/75.05

(58) Field of Classification Search .................. 702/142, 702/145
See application file for complete search history.

(56) References Cited

U.S. PATENT DOCUMENTS

| | | | |
|---|---|---|---|
| 4,737,868 A * | 4/1988 | Kimura et al. ............... | 360/74.4 |
| 5,979,813 A | 11/1999 | Mansbridge et al. | |
| 6,398,143 B1 | 6/2002 | Kim et al. | |
| 6,427,934 B1 | 8/2002 | Saliba et al. | |
| 6,568,617 B1 | 5/2003 | Rambosek | |
| 6,637,691 B1 | 10/2003 | Hamming et al. | |
| 6,853,514 B2 * | 2/2005 | Li et al. ..................... | 360/77.04 |
| 6,945,489 B2 | 9/2005 | Anderson et al. | |
| 7,199,956 B1 * | 4/2007 | Moser et al. .................... | 360/46 |
| 7,578,898 B2 * | 8/2009 | Le Gal .......................... | 156/192 |
| 2004/0130818 A1 * | 7/2004 | Chliwnyj et al. ............ | 360/72.1 |
| 2005/0006513 A1 * | 1/2005 | Christie ........................ | 242/338 |
| 2008/0144211 A1 * | 6/2008 | Weber et al. ................. | 360/77.12 |
| 2009/0206190 A1 * | 8/2009 | Bui et al. .................... | 242/390.9 |

* cited by examiner

*Primary Examiner* — Jonathan C. Teixeira Moffat
(74) *Attorney, Agent, or Firm* — Baker Botts L.L.P.

(57) ABSTRACT

In a method of electronically measuring reel off-center run-out and reel hub mismatch, tape speed data related to a tape coupled with an operating drive reel is electronically measured. The tape speed data is correlated with drive reel rotation angles. The correlated tape speed data is translated to drive reel hub radii variations with respect to the drive reel rotation angles. The drive reel hub radii variations comprise an operational measure of reel off-center run-out and reel hub mismatch of the drive reel.

18 Claims, 7 Drawing Sheets

300

```
┌─────────────────────────────────────────────────────────────────┐
│  ACCESS ELECTRONICALLY MEASURED TAPE SPEED DATA RELATED TO A    │
│           TAPE COUPLED WITH AN OPERATING DRIVE REEL.            │
│                              310                                │
└─────────────────────────────────────────────────────────────────┘
                                 │
                                 ▼
┌─────────────────────────────────────────────────────────────────┐
│       CORRELATE THE TAPE SPEED DATA WITH REEL ROTATION ANGLES.  │
│                              320                                │
└─────────────────────────────────────────────────────────────────┘
                                 │
                                 ▼
┌─────────────────────────────────────────────────────────────────┐
│   TRANSLATE CORRELATED TAPE SPEED DATA TO REEL HUB RADII        │
│      VARIATIONS WITH RESPECT TO THE REEL ROTATION ANGLES.       │
│                              330                                │
└─────────────────────────────────────────────────────────────────┘
                                 │
                                 ▼
┌─────────────────────────────────────────────────────────────────┐
│  DETERMINE IF A REEL HUB RADIUS VARIATION OF THE REEL HUB RADII │
│  VARIATIONS COMPLIES WITH A SPECIFIED RADIUS VARIATION TOLERANCE.│
│                              340                                │
└─────────────────────────────────────────────────────────────────┘
                                 │
                                 ▼
┌─────────────────────────────────────────────────────────────────┐
│     PROVIDE INFORMATION RELATED TO THE REEL HUB RADII VARIATIONS.│
│                              350                                │
└─────────────────────────────────────────────────────────────────┘
```

FIG. 3

ELECTRONIC MEASUREMENT OF OFF-CENTER RUN-OUT AND REEL-HUB MISMATCH

BACKGROUND

In a tape drive, such as linear tape drive, the tape speed during operation is typically around 5-10 meters per second, with the reels rotating at around 20-60 times per second. Additionally, on a typical half inch tape, there may be 1000 or more data tracks spaced laterally across the tape. Because of these speeds and the density of data tracks several characteristics related to the reels need to be well controlled, or else errors in reading and writing the tape are more likely to occur.

For example, the off-center run-out of the reels needs to be well controlled to avoid exciting tape vibration. It is also important to avoid any sudden protrusion or recession on the reel hubs that can cause sudden disturbance to the tape motion longitudinally and/or laterally. Longitudinal tape motion can cause an error in linear density of the data, while lateral tape motion can be so fast that the head of the tape drive cannot accurately follow and read from or write to the tightly spaced adjacent data tracks. At an extreme, a protrusion or recession on a tape reel can also cause embossment on the tape and possibly data loss.

In a single reel tape cartridge drive, the tape drive utilizes grabbers or bucklers to thread the tape from the cartridge to the drive reel. As such, there is an unavoidable grabber or buckler mismatch to the drive reel hub. Further, in a single reel cartridge, media in the cartridge usually employs a splicing tape to connect the leader tape to the magnetic tape. The added thickness of this splicing tape also adds mismatch to the drive reel hub.

In an effort to avoid the problems described above, reel hub mismatch is typically tightly controlled, often with 50 μm or less. A conventional method for control employs a dial indicator to measure assembled drive reel hubs to confirm that circularity falls within a predefined range. While this provides a good initial check, dial indicator testing lacks accuracy because pressure is not applied to the grabbers or bucklers as would be applied by a tape wrapped around the drive reel hub or cartridge reel hub in an operational situation. Further, use of a dial indicator in an operational situation would scratch a tape. Additionally, a dial indicator measurement would be difficult or impossible within an assembled tape drive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a method of electronically measuring reel off-center run-out and reel hub mismatch, tape speed data related to a tape coupled with an operating drive reel is electronically measured. The tape speed data is correlated with drive reel rotation angles. The correlated tape speed data is translated to drive reel hub radii variations with respect to the drive reel rotation angles. The drive reel hub radii variations comprise an operational measure of reel off-center run-out and reel hub mismatch of the drive reel.

DESCRIPTION OF THE DRAWINGS

The accompanying drawings, which are incorporated in and form a part of this specification, illustrate embodiments of the subject matter and, together with the description, serve to explain principles discussed below:

FIG. 3 shows a flow diagram of an example method of electronically measuring reel off-center run-out and reel hub mismatch, according to an embodiment.

Figure 1:
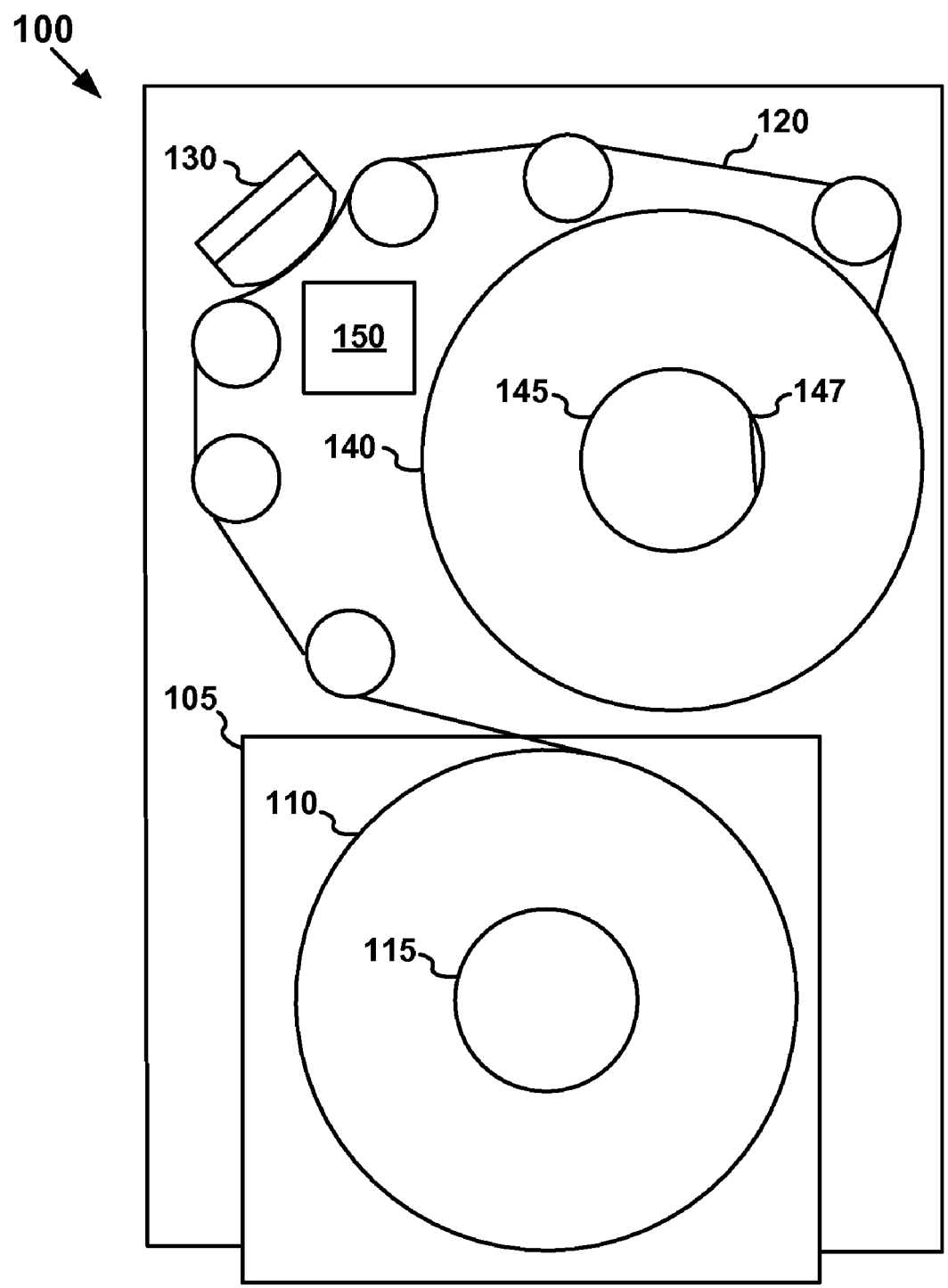
FIG. 1 is a diagram of an example tape drive incorporating an embodiment of the subject matter described herein.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "accessing," "measuring," "correlating," "translating," "determining," "providing," "fitting," "subtracting," "utilizing," "outputting," or the like, refer to the actions and processes of a computer system, measurement module, microcontroller, processor, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. In some embodiments, as described herein, a processor and/or measurement module resides within and/or is coupled with a tape drive.

Overview of Discussion

In a tape drive, a tape is transported from a supply reel (referred to herein as a cartridge reel) to a take up reel (referred to herein as a drive reel). Between these reels the tape is guided by tape guides and wrapped on a read/write head for recording and playback. In an operating linear tape drive, for example, the tape speed between the reels is on the order of 5-10 meters/second. In order to prevent and reduce errors in reading and writing, it is useful to control and minimize any mismatch to the drive reel hub caused by grabbers, bucklers, or tape splices. By controlling/minimizing such mismatch, embossment of the tape is reduced or avoided and sudden tape motion longitudinally or laterally is reduced. The embodiments described herein, utilize functions of the tape drive to electronically measure reel off-center run-out and/or reel hub mismatch.

Discussion will begin with a description of an example tape drive with which, or upon which, embodiments described herein may operate. Discussion will proceed to a description of an example measurement module for a tape drive, which operates to electronically measure reel off-center run-out and reel hub mismatch. Components of the measurement module will be described. Operation of the example measurement module and its components will then be described in more detail in conjunction with a description of an example method of electronically measuring reel off-center run-out and reel hub mismatch.

Example Tape Drive

FIG. 1 is a diagram of an example tape drive 100 incorporating an embodiment of the subject matter described herein. Tape drive 100 represents a generic tape drive, and is shown by way of example and not of limitation. It is appreciated that the subject matter described herein is not limited to use with/within tape drive 100, but instead is operable with/within a variety of tape drives. Tape drive 100 is shown with a tape cartridge 105 inserted into tape drive 100. Tape cartridge 105 is removable from tape drive 100, and includes a cartridge reel 110 with a cartridge reel hub 115. Tape 120 is spooled about cartridge reel hub 115 of cartridge reel 110. Tape cartridge 105 supplies tape 120 to tape drive 100. Tape drive 100 includes a drive reel 140 which takes up tape 120 from tape cartridge 105 (when inserted).

A portion of tape 120 (such as a leader) is coupled to drive reel hub 145 by means of a fastening device 147, such as, for example, a grabber or buckler. Fastening device 147 engages tape 120 and then integrates or blends with drive reel hub 145, thereby coupling tape 120 to drive reel hub 145. When integrating with drive reel hub 145, the goal is for fastening device 147 and drive reel hub 145 to integrate into a perfect circle with a uniform radius. However, even in tightly controlled manufacturing processes there is variation in the circularity of a reel hub. This manufacturing variation in the radii or circularity of a reel hub, such as drive reel hub 145, is referred to as reel off-center-run out. Additionally, some portion of the radius of drive reel hub 145 typically protrudes or recesses slightly in the area where fastening device 147 couples with drive reel hub 145. Likewise, in operation, the thickness of a splicing tape which couples a leader and media of tape 120 typically adds some amount of effective protrusion to the radius of tape spooled about drive reel hub 145. This is because the thickness of the splicing tape is much greater than the thickness of other portions of tape 120. For example, the media of tape 120 may be on the order of 8 microns thick, while the spliced region of the media and leader may be on the order of 20 microns thick. The term mismatch is used to refer to variations in operational circularity caused by the integration or blending of fastening device 147 with drive reel hub 145 or by a splice in tape 120.

During operation of tape drive 100 and drive reel 140, tape 120 is spooled between drive reel 140 and cartridge reel 110 and in the process is guided longitudinally across head 130. Head 130 operates to read data from or write data to tape 120 as tape 120 travels longitudinally in proximity to head 130 while being spooled between drive reel 140 and cartridge feel 110.

Measurement module 150 is communicatively coupled with head 130 and with drive reel 140 (e.g., to a motor or encoder coupled with cartridge reel 110) and, in one embodiment, measures or accesses information regarding the operation of both. For example, in one embodiment, measurement module 150 measures or accesses drive reel information such as the angle of rotation of drive reel 140 at a particular point in time or with respect to a particular location of tape 120. In one embodiment, measurement module 150 communicatively couples with head 130 to electronically measure or access information such as the tape speed of tape 120 as tape 120 spools between drive reel 140 and cartridge reel 110. In one embodiment, measurement module 150 is communicatively coupled with cartridge reel 110 (e.g., to a motor or encoder coupled with cartridge reel 110) to measure or access information related to the operation of cartridge reel 110. For example, in one embodiment, measurement module 150 measures or accesses cartridge reel information such as the angle of rotation of cartridge reel 110 at a particular point in time or with respect to a particular location of tape 120. It is appreciated that functions of measurement module 150 can be implemented as a single module, circuit, or microcontroller; implemented in whole or in part with one or more other components of tape drive 100; or implemented in whole or in part external to tape drive 100 (e.g. by a processor of a computer system coupled with tape drive 100).

Example Measurement Module

Figure 2:
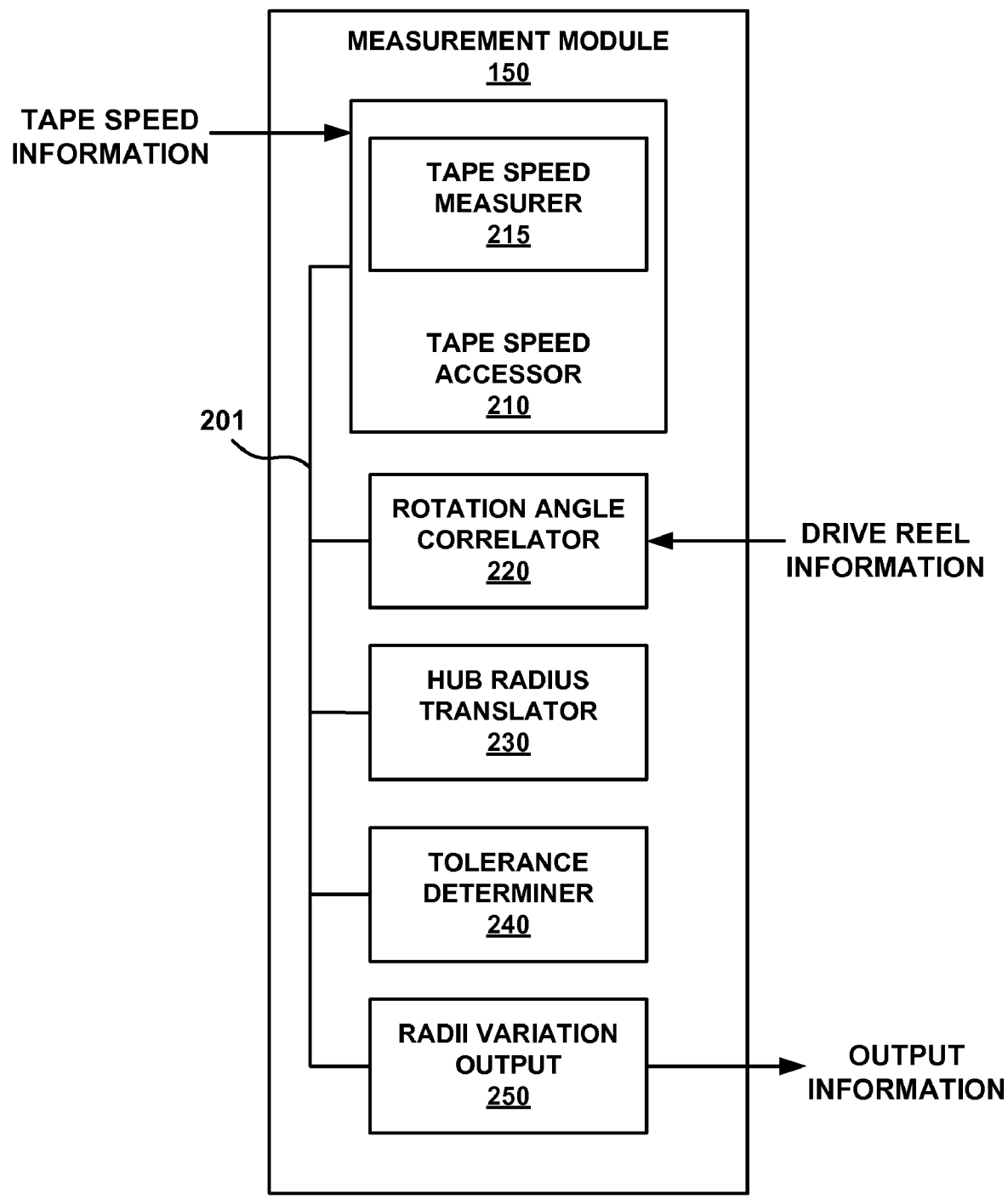
FIG. 2 shows a block diagram of example measurement module for a tape drive, according to an embodiment.

FIG. 2 shows a block diagram of example measurement module 150 for a tape drive according to an embodiment. Measurement module 150 is communicatively coupled with head 130, drive reel 140, and/or cartridge reel 110. Measurement module 150 operates to electronically measure operational circularity and variations thereof, such as reel off-center run-out and reel hub mismatch of a reel hub, such as drive reel hub 145 and/or cartridge reel hub 115.

With reference now to FIG. 2, in one embodiment, measurement module 150 includes a tape speed accessor 210, a rotation angle correlator 220, a hub radius translator 230, a tolerance determiner 240, and a radii variation output 250. The components of measurement module 150 are coupled, such as by bus 201, for the interchange of information as required. In some embodiments, additional component(s) such as a processor, microcontroller, application specific integrated controller and/or data storage features (e.g., read only memory (ROM) and/or random access memory (RAM)) is/are included in or used to implement functions of measurement module 150, however, these and other components are not described in detail herein so as not to obscure aspects of the subject matter being described. It is appreciated that, in some instances, all or portions of some embodiments of measurement module 150 described herein are composed of computer-readable and computer-executable instructions that reside, for example, in computer-usable/computer-readable media such as a memory or firmware of measurement module 150.

Tape speed accessor accesses electronically measured tape speed data related to the tape during the operation of drive reel 140. Tape speed is indicative of actual speed of tape 120, not motor or hub speed related to drive reel 140 or cartridge reel 110. Tape speed accessor 210 can access tape speed information in the form of electronically measured tape speeds (tape speed data) collected by another portion of tape drive 100. Tape speed accessor 210 can also utilize tape speed measurer 215 to actively electronically measure the speed of the tape 120 as tape 120 spools between drive reel 140 and cartridge reel 110. For example, in one embodiment, tape speed measurer 215 accesses tape speed information in the form of Position Error Signals (PES) read from PES markings read by head 130. The PES markings occur at known recurring longitudinal intervals (e.g., every 100 microns) on tape 120. Tape speed measurer 215 electronically measures time between PES markings on tape 120 and uses the timing to determine tape speeds (tape speed data) of tape 120 based upon lapsed time between the PES intervals.

In one embodiment, the tape speed data is accessed or measured during reverse tape motion near beginning of tape (BOT). In such an embodiment, what is meant by near BOT is that more of tape 120 is spooled onto cartridge reel 110 than onto drive reel 140, however enough of tape 120 remains spooled onto drive reel 140 to collect tape speed data which will correlate to each degree (or substantially every degree) of a once around of drive reel hub 145. To collect tape speed data correlated to each of 360 degrees of drive reel hub 145 may take numerous rotations of drive reel 140 (testing has shown that 20-30 revolutions of drive reel 140 is usually sufficient). Thus, in one embodiment collecting data near BOT supposes that at least enough tape 120 for approximately 20-30 revolutions of drive reel 140 remains. If more tape speed data is utilized, more of tape 120 should remain on drive reel 140, if less tape speed data is utilized, then less of tape 120 will be used. For example, in one embodiment, tape speed data is collected for only a certain number of revolutions of drive reel 140, such as 15, 27, or 38 revolutions. This may result in tape speed data for each of 360 degrees of rotation of drive reel hub 145, or this may result in only collecting tape speed data for a substantial number of the 360 degrees data. For example, when tape speed data is collected for only a fixed number or rotations of drive reel 140, tape speed data correlated to rotational angles may be randomly missing for several degrees (e.g., 10 degrees) of a full rotation of drive reel hub 145. This tape speed data measured near BOT is used to estimate the drive reel off-center run-out, mismatch due to grabber/buckler protrusion or recession, and/or mismatch due to splicing tape protrusion related to drive reel hub 145.

In another embodiment, the tape speed data is accessed or measured during forward tape motion near end of tape (EOT). The same guidelines for the amount of tape near BOT apply to the amount of tape used near EOT for collecting tape speed data. Thus, in one embodiment where tape speed data is being correlated to 360 degrees of cartridge reel hub 115, being near EOT supposes that there exists more of tape 120 spooled onto drive reel 140 than onto cartridge reel 110. However, at least enough of tape 120 remains on cartridge reel 110 for approximately 20-30 revolutions of cartridge reel 110. This tape speed data measured near EOT can be used to estimate the cartridge reel off-center run-out (if any) of cartridge reel hub 115. Because grabbers, bucklers, and splicing are not typically used in a cartridge, such as cartridge 105, mismatch of cartridge reel hub 115 is not typically measured.

Rotation angle correlator 220 correlates the accessed tape speed data with drive reel rotation angles and/or cartridge reel rotation angles. For example, via communicative coupling with drive reel 140 (e.g., to the motor which rotates drive reel 140 or an encoder coupled with drive reel 140) the angle of rotation at any particular time during operation can be accessed. Rotation angle correlator 220 correlates rotation angles at a particular time with tape speed data accessed or measured by tape speed accessor 210 and associated with the same particular time. In one embodiment, rotation angle correlator 220 communicates with tape speed accessor 210 to indicate when a suitable amount of tape speed data has been accumulated. In this manner, collection of tape speed data and correlation with rotation angles of drive reel 140 (or with cartridge reel 110) is ceased after a predetermined amount of correlated tape speed data is collected. For example, in one embodiment, collection and correlation is ceased after correlated tape speed data exists for each of 360 degrees of a once around of drive reel 140. In such an embodiment, there may be two or more correlated tape speeds for some degrees of the once around and only one correlated tape speed for other degrees of the once around. It is appreciated that more or less correlated tape speed data can be utilized in other embodiments. In a similar manner, in one embodiment, Rotation angle correlator 220 can also correlate the accessed tape speed data with cartridge reel rotation angles.

Hub radius translator 230 translates correlated tape speed data to reel hub radii variations with respect to reel rotation angles. For example, in one embodiment, hub radius translator 230 translates correlated tape speed data to drive reel hub radii variations with respect to associated drive reel rotation angles. Such drive reel hub radii variations comprise a measure of operational circularity of drive reel hub 145 by mapping variations of radius to angular locations of drive reel hub 145. These mapped radius variations show the radial location and the magnitude (protrusion or recession) of variation from a baseline radius tolerance of drive reel hub 145. As will be further described in conjunction with flow diagram 300 (FIG. 3), in one embodiment hub radius translator 230 performs the translation from tape speed data to variations in radii by curve fitting a first order sine wave to an averaged wave form created from the correlated tape speed data. Hub radius translator 230 subtracts the amplitude of the curve fitted sine wave from the amplitude of the averaged wave form to determine radius variation information at various rotational angles of a reel hub, such as drive reel hub 145. Additionally, in some embodiments, conversion factors are employed by hub radius translator 230 to convert the radius variation information into desired units, such as mils or microns. In a similar manner, in one embodiment, hub radius translator 230 can also translates correlated tape speed data to cartridge reel hub radii variations with respect to associated cartridge reel rotation angles.

Tolerance determiner 240 determines whether a reel hub radius variation in a set of reel hub radii variations complies with a specified radius variation tolerance for a reel hub. For example, in one embodiment, tolerance determiner 240 determines whether a drive reel hub radius variation in a set of drive reel hub radii variations complies with a specified radius variation tolerance for drive reel hub 145. In one embodiment, this involves a comparison to a predetermined baseline radius tolerance for drive reel hub 145. For example, in one embodiment, tolerance determiner notes as "out of tolerance" any radius variation which exceeds +/−20 mils. Additionally, in one embodiment, tolerance determiner 240 also notes and correlates the rotational angle of drive reel 140 at which any out of tolerance radius variation is noted. Tolerance determiner 240 then provides any noted radius tolerance variation either as an output, such as to a technician, a user, a computer system, or to radii variation output 250. It should be appreciated that tolerance determiner 240 is not utilized in every embodiment of measurement module 150. For example, in some embodiments raw radii variation information may instead be output, and a computer system coupled with tape drive 100, a technician, a user, or some other entity, can determine whether or not an out of tolerance condition exists with drive reel hub 145. It is appreciated that in a similar manner, in one embodiment, tolerance determiner 240 determines whether a cartridge reel hub radius variation in a set of cartridge reel hub radii variations complies with a specified radius variation tolerance for cartridge reel hub 115.

Radii variation output 250 outputs information related to reel hub radii variations. In one embodiment, this comprises radii variation output 250 outputting information related to drive reel hub radii variations related to drive reel hub 145. In some embodiments, this can include collecting and/or conditioning information prior to output. Examples of information collected include "out of tolerance" information from tolerance determiner 240, run-out amplitude and phase, maximum change in radius of drive reel hub 145 (and rotational degree of occurrence), minimum change in radius of drive reel hub 145 (and rotational degree of occurrence), peak drive reel radius variation (and rotational degree of occurrence), and mean drive reel radius of drive reel hub 145. Other information can include average speed of drive reel 140 during tape speed data collection, number of revolutions of drive reel 140 from which tape speed data was collected, and number of missing degrees in a once around of drive reel hub 145 that exist in the correlated tape speed data. An example of conditioning information prior to output includes converting data into a desired format, such as a desired unit of measure prior to output.

It is appreciated that any combination of the above mentioned examples of collected data can be provided as an output by radii variation output 250. Such information is output to a computer system coupled with tape drive 100, a technician, a user, or to some other entity. Such information allows determination of whether or not an out of tolerance condition exists with drive reel hub 145. For example, in one embodiment, radii variation output 250 provides as an output one or more of: maximum drive reel radius variation (and optionally a rotational degree of occurrence), minimum drive reel radius variation (and optionally a rotational degree or occurrence), and peak drive reel radius variation (and optionally rotational degree of occurrence). Based on such information, a technician assembling or testing tape drive 100, can easily determine whether drive reel hub 145 meets or fails to meet a radius variation tolerance. In a similar manner, in one embodiment, radii variation output 250 provides for output of similar information related to cartridge reel hub radii variations related to cartridge reel hub 115.

Example Methods of Operation

The following discussion sets forth in detail the operation of some example embodiments. With reference to FIG. 3, flow diagram 300 illustrates example procedures used by various embodiments. Flow diagram 300 includes processes that, in various embodiments, are carried out by a processor under the control of computer-readable and computer-executable instructions. The computer-readable and computer-executable instructions for executing the method illustrated by flow diagram 300 reside, for example, in any tangible computer-readable media, such as data storage features internal or external to tape drive 100. For example, in one embodiment the computer-readable and computer-executable instructions, reside on computer-readable media such as a ROM or firmware of a microcontroller which, is/are used to perform the functions of, or operate in conjunction with, for example, measurement module 150 of FIGS. 1 and 2. In another example, such computer-readable and computer-executable instructions may reside on a computer-readable storage media such as a diskette (e.g., a Compact Disc Read Only Memory (CD-ROM)) which is used to control operation of a processor in a computer system coupled with tape drive 100. Although a specific flow of procedures is disclosed in flow diagram 300, such a flow is provided for example. That is, embodiments are well suited to performing various other procedures or variations of the procedures recited in flow diagram 300. It is appreciated that the procedures in flow diagram 300 may be performed in an order different than presented, and that not all of the procedures in flow diagram 300 may be performed in every embodiment.

FIG. 3 shows a flow diagram 300 of an example method of electronically measuring reel off-center run-out and reel hub mismatch, according to an embodiment. These electronic measurements provide a measure of the operational circularity of a drive reel hub of a tape drive and/or of a cartridge reel hub of a tape cartridge. Because operational circularity is measured while spooling a tape, this measure of operational circularity can differ from a static measure of circularity (e.g., a measurement made with a dial indicator). Thus, for example, by use of the method illustrated in flow diagram 300, it may be found that a drive reel hub which met a non-operational static tolerance for reel off-center run-out and reel hub mismatch will exhibit an operational circularity or radius variation which is outside of a pre-specified tolerance. Although discussion is focused mainly on determining variations in operational circularity of a drive reel hub, it is appreciated that the method described in flow diagram 300 is also applicable to determining variations in operational circularity of a cartridge reel hub. Elements of flow diagram 300 are described below, with reference to elements of tape drive 100 of FIG. 1 and to elements of measurement module 150 of FIG. 2.

At 310 of flow diagram 300, in one embodiment, the method accesses electronically measured tape speed data related to a tape coupled with an operating drive reel. For example, in one embodiment, this comprises tape speed accessor 210 accessing tape speed information regarding the speed of tape 120 during operation of tape drive 100 while tape 120 is coupled with drive reel 140. This can comprise accessing tape speed information in the form of electronically measured tape speeds (tape speed data) collected by another portion of tape drive 100. This can also comprise utilizing tape speed measurer 215 to actively electronically measure the speed of the tape 120 as tape 120 spools between drive reel 140 and cartridge reel 110. For example, in one embodiment, tape speed accessor 210 notes a tape speed of 4.54 meters/second which is electronically measured at particular time, T1. In one embodiment such tape speed data is electronically measured by measuring elapsed time between PES markings on tape 120. This measuring can be performed during forward or reverse tape motion. For instance, in one embodiment, the speed of 4.54 meters/second comprises electronically measured tape speed data measured during reverse tape motion near BOT.

At 320 of flow diagram 300, in one embodiment, the method correlates the tape speed data with reel rotation angles. In one embodiment, this comprises rotation angle correlator 220 correlating the tape speed data with cartridge reel rotation angles of cartridge reel 110. In one embodiment, this comprises rotation angle correlator 220 correlating the tape speed data with drive reel rotation angles of drive reel 140. For example, in an instance of correlating tape speed data to drive reel rotation angles, rotation angle correlator 220 determines a rotation angle of a position of drive reel 140 at a particular time of measurement (e.g. time T1) of a tape speed of the tape speed data. For purpose of example, the determined rotation angle can be assumed to be 0 degrees. The tape speed at the particular time (e.g., time T1) is correlated with the associated rotation angle at the same particular time (e.g. time T1). For purposes of example, the tape speed of 4.54 meters/second, in one embodiment, is thus associated with the drive reel rotation angle of 0 degrees. This correlation process is repeated for other tape speeds of the tape speed data. In a similar manner, rotation angle correlator 220 can additionally or alternatively correlate tape speed data with rotation angles of a cartridge reel, such as cartridge reel 110.

TABLE 1

Example Tape Speed Data Correlated with Drive Reel Rotation Angles

|  | Drive Reel Rotation Angle | | | | |
| --- | --- | --- | --- | --- | --- |
|  | 0 | 1 | 2 | ... | 359 |
| Number of Tape Speed Data Points | 1 | 1 | 1 | ... | 2 |
| Sum of Tape Speed Data | 4.53 | 4.54 | 4.54 | ... | 9.08 |
| Averaged Tape Speed Data (m/sec) | 4.53 | 4.54 | 4.54 | ... | 4.54 |

In one embodiment a data set of the correlated tape speed data is created. Table 1 shows an example of such a data set correlated to drive reel rotation angles. As shown in Table 1, in one embodiment, when multiple data points exist for a particular degree of reel rotation, the data points are summed and averaged.

Figure 4:
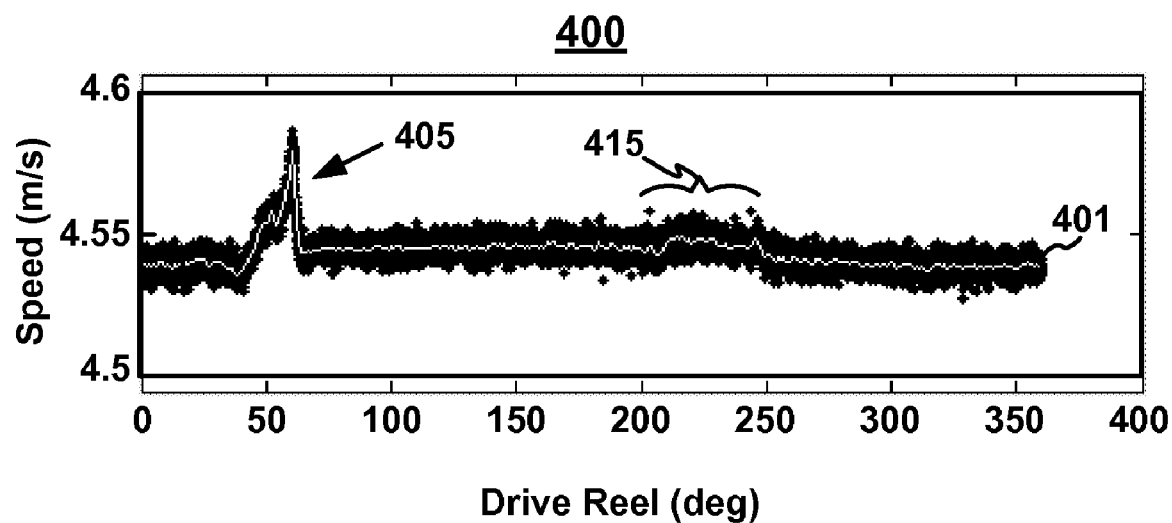
FIG. 4 shows an example graph of tape speed data graphed versus drive reel rotation angle, according to an embodiment.

FIG. 4 shows an example graph 400 of tape speed data graphed versus drive reel rotation angle, according to an embodiment. For purposes of example, the tape speed data in graph 400 represents at least one tape speed data point for each of 360 degrees of a rotation of drive reel 140. In graph 400 a line 401, representing average tape speed data, is superimposed over the graph of the tape speed data points. A peak 405 exists in the 45-60 degree range of the angle of rotation. Peak 405 represents a slightly increased speed caused by off-center run-out and/or by mismatch of fastening device 147, which protrudes slightly from drive reel hub 145. A hump 415 exists in the 200-250 degree range of the angle of rotation. Hump 415 represents a slightly increased speed caused by off-center run-out and/or by mismatch due to tape splicing which causes a small protrusion in spooled tape and effectively causes a slight increase in the radius of drive reel hub 145. It is appreciated that in some embodiments, a slight recess in speed will be noted at a rotational location of a run-out error or mismatch which causes a small recession in the radius of drive reel hub 145.

Figure 5:
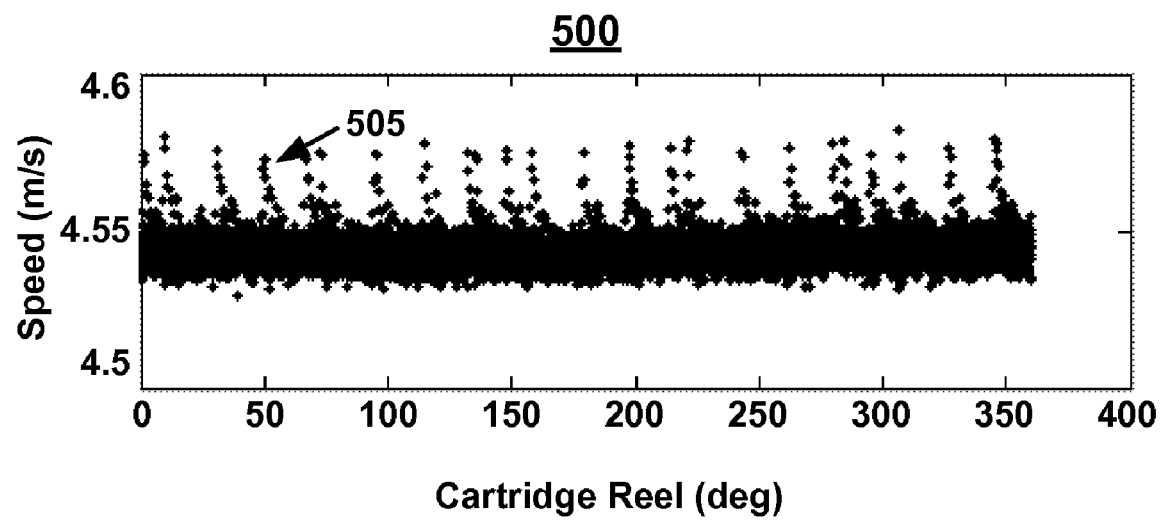
FIG. 5 shows an example graph of the same tape speed data shown in FIG. 4, but graphed versus cartridge reel rotation angles, according to an embodiment.

FIG. 5 shows an example graph 500 of the same tape speed data during reverse tape motion which is shown in FIG. 4, however, graphed versus cartridge reel rotation angles in FIG. 5, according to an embodiment. For purposes of example, the tape speed data in graph 500 represents at least one tape speed data point for each of 360 degrees of a rotation of cartridge reel 110. Several peaks, such as peak 505 exist in a substantially repetitive fashion. Peaks, such as peak 505, represent a slightly increased speed caused by run-out or mismatch of drive reel hub, as a result, they are synchronous to the drive reel hub in FIG. 4, but are not synchronous to the cartridge reel hub as shown in FIG. 5.

At 330 of flow diagram 300, in one embodiment, the method translates correlated tape speed data to reel hub radii variations with respect to reel rotation angles. In an embodiment where the correlated tape speed data is correlated with drive reel rotation angles, this comprises translating the correlated tape speed data to drive reel hub radii variations with respect to drive reel rotation angles. In an embodiment where the correlated tape speed data is correlated with cartridge reel rotation angles, this comprises translating the correlated tape speed data to cartridge reel hub radii variations with respect to cartridge reel rotation angles. After translation the reel hub variations comprise an operational measure of reel off-center run-out and reel hub mismatch. This is an operational measure of the circularity of a reel hub (e.g. drive reel hub 145), and can provide a primary or secondary tolerance check during manufacture of tape drive 100 or can provide an operational state-of-health type check during use of tape drive 100. For example, after translation of the tape speed data of FIG. 4, the reel hub variations provide an operational measure of reel off-center run-out and reel hub mismatch of drive reel hub 145.

In one embodiment, the translation of correlated tape speed data is accomplished by fitting a sine wave to a set of data comprising average tape speed data which has been correlated with reel (drive reel or cartridge reel) rotation angles. For example, in one embodiment, a Fourier transform is used to fit a first order harmonic sine wave to the average wave form (e.g., line 401) represented by the set of data. The amplitude information of the fitted sine wave is then subtracted from elements of the set of data to translate the tape speed data to drive reel hub radii variations with respect to the drive reel rotation angles. The amplitude of the fitted sine wave provides a y-axis offset for the sine wave, while the phase of the fitted sine wave provides the phase of the sine wave at a starting point with an x-axis value of 0. Equations 1, 2, 3, and 4 provide examples of calculating the amplitude and phase of a fitted sine wave.

Equation 1 is used to determine the cosine portion of total amplitude.

$$B_{cos} = \frac{2}{360} * \sum_{deg=0}^{359} (averagespeed_{deg} * \cos_{deg}) \qquad (1)$$

where:

$B_{cos}$ is the cosine portion of the total amplitude of the fitted sine wave;

$averagespeed_{deg}$ is the average of tape speed data points for a particular degree of reel rotation; and $\cos_{deg}$ is the cosine at the degree of reel rotation which correlates to the $averagespeed_{deg}$.

Equation 2 is used to determine a sine portion of total amplitude.

$$B_{sin} = \frac{2}{360} * \sum_{deg=0}^{359} (averagespeed_{deg} * \sin_{deg}) \qquad (2)$$

where:

$B_{sin}$ is the sine portion of the total amplitude of the fitted sine wave;

$averagespeed_{deg}$ is the average of tape speed data points for a particular degree of reel rotation; and $\sin_{deg}$ is the sine at the degree of reel rotation which correlates to the $averagespeed_{deg}$.

Equation 3 is used to sum the cosine and sine portions of amplitude to get a total amplitude of a fitted sine wave. This amplitude determines a y offset from the x-axis for the fitted sine wave.

$$B_{total} = \sqrt{B_{cos}^2 + B_{sin}^2}$$

where:

$B_{total}$ is the total amplitude of the fitted sine wave.

Equation 4 is used to determine the phase of the fitted sine wave. The phase determines the phase at which the fitted sine wave will originate at as it crosses the y-axis with an x-axis value of 0.

$$phi = \tan^{-1}\left(\frac{-B_{sin}}{B_{cos}}\right) \quad (4)$$

where:

phi is the phase of the fitted sine wave.

Figure 6:
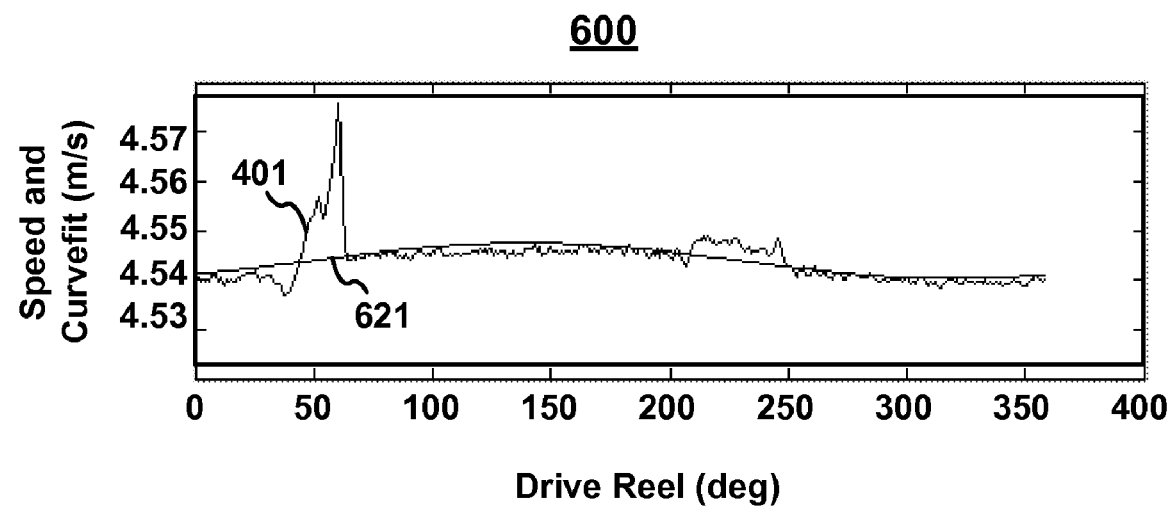
FIG. 6 shows an example graph of a sine wave fitted to a plot of average tape speed graphed data versus drive reel rotation angles, according to an embodiment.

FIG. 6 shows an example graph 600 of a sine wave 621 fitted to a plot of average tape speed data (shown by line 401) which is graphed versus drive reel rotation angles, according to an embodiment. Graph 600 follows the same example and uses the same tape speed data as shown in FIG. 4.

Equation 5 shows an example of a calculation which can be performed to determine eccentricity (variation in reel hub radius) due to run-out and/or mismatch. For example, by applying Equation 5 to the entire set of data represented by line 401 and sine wave 621 a set of reel hub radii variations is created for drive reel hub 145. In essence, Equation 5 converts from units of tape speed to units of dimension.

$$eccentricity = \frac{B_{total}}{averagespeed} * Average\_reel\_hub\_radius * unit\_conversion\_factor \quad (5)$$

where:

$B_{total}$ is amplitude of a fitted sine wave in meters/second;
averagespeed is the average tape speed in meters/second;
average_reel_hub_radius is the average radius (typically in millimeters) of the reel hub which the data represents; and
unit_conversion_factor is a conversion factor for converting millimeters to a desired unit such as microns or mils (the unit conversion factor is not required).

Figure 7:
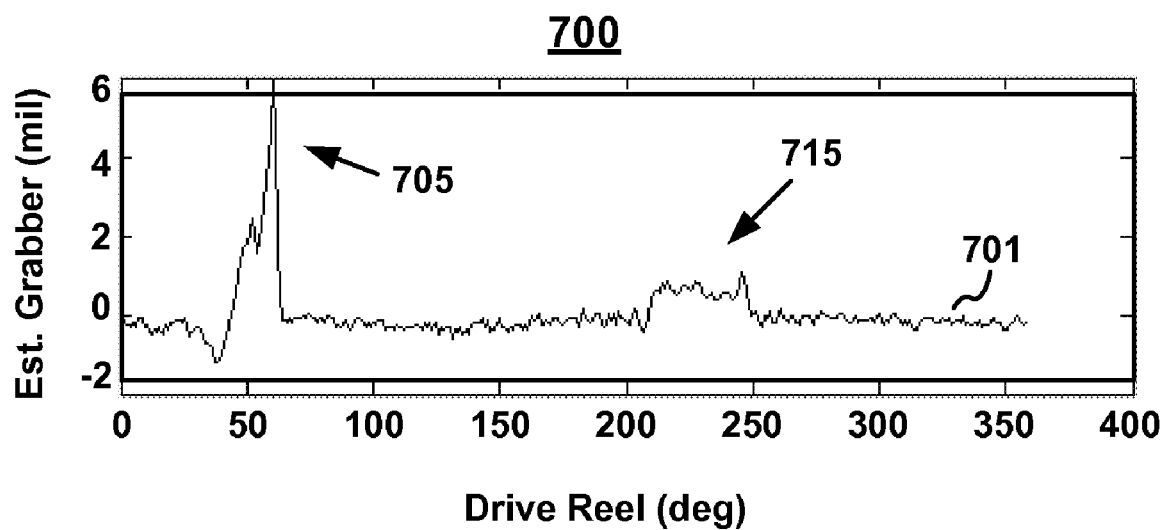
FIG. 7 shows an example graph of drive reel hub radii variations graphed versus drive reel rotation angles, according to an embodiment.

FIG. 7 shows an example graph 700 of drive reel hub radii variations graphed versus drive reel rotation angles, according to an embodiment. Line 701 represents the translated result (the variations in reel hub radii) after amplitude of sine wave 621 is removed from line 401 (both shown in FIG. 6). As shown in Graph 700, there is a large radius variation 705 located between approximately 40 degrees and 60 degrees and a smaller radius variation 715 located between 200 degrees and 250 degrees. It is appreciated that a graph, such as graph 700 (or graphs 400, 500, or 600) is not required, however, in one embodiment radii variation output 250 can output such data or such a graph for display by a computer system coupled with tape drive 100.

At 340 of flow diagram 300, in one embodiment, the method determines if a reel hub radius variation of the set of reel hub radii variations complies with a specified radius variation tolerance. In one embodiment, this comprises determining if a cartridge reel hub radius variation of a set of cartridge reel hub radii variations complies with a specified radius variation tolerance for cartridge reel hub 115. In one embodiment, this comprises determining if a drive reel hub radius variation of a set of drive reel hub radii variations complies with a specified radius variation tolerance for drive reel hub 145. With reference to the set of drive reel hub variations shown by line 701 of graph 700, consider an example where drive reel hub tolerance is +/−2 mils for drive reel hub 145. In such an example, it is clear from spike 705 that drive reel hub 145 exhibits a variation in operational circularity (due to run-out, mismatch, or both) which causes drive reel hub 145 to exceed this specified radius variation tolerance.

Equation 6 shows an example of a calculation which can be performed upon a reel hub radius variation or a set of reel hub radii variations in order to determine a change in radius. By utilizing equation 6 over an entire data set of reel hub radii variations, a maximum, minimum, and peak radius change can be determined. It is appreciated that in some instances due to recessed mismatch the minimum and/or peak radius change can be negative.

$$\Delta R_{deg} = \quad (6)$$
$$averagespeed_{deg} - averagespeed -$$
$$\frac{B_{total} \cdot \cos(phi + deg)}{averagespeed} * \left(\frac{average\_reel\_hub\_radius *}{unit\_conversion\_factor}\right)$$

where:

$averagespeed_{deg}$ is the average of tape speed data points for a particular degree of reel rotation;
$eccentricity_{deg}$ is the determined eccentricity (hub radius variation) for a particular degree of reel rotation;
averagespeed is the average tape speed in meters/second;
average_reel_hub_radius is the average radius (typically in millimeters) of the reel hub which the data represents; and
unit_conversion_factor is a conversion factor for converting millimeters to a desired unit such as microns or mils (the unit conversion factor is not required).

At 350 of flow diagram 300, in one embodiment, the method provides information related to the reel hub radii variations which are noted, for example, by hub radius translator 230 and/or tolerance determiner 240. In one embodiment, this comprises radii variation output 250 providing information as an output from measurement module 150. This output information can, for example, be displayed on a display by computer coupled with measurement module 150. Depending upon the data, this can comprise providing information related to one or more drive reel hub variations or information related to one or more cartridge reel hub variations. For example, in one embodiment this comprises providing an indication if a drive reel hub radius variation is out of compliance with a specified radius variation tolerance. In the example illustrated by FIG. 7, an indication would be provided that drive reel hub 145 exceeds the +/−2 mil radius tolerance.

In one embodiment, such an indication can be provided as a measure of quality control in manufacture of tape drive 100. For example, radii variation output 250, in one embodiment, indicates that drive reel hub 145 of drive reel 140 is within/outside accepted tolerances. This allows a technician, assembly robot, or other entity to be apprised of whether drive reel hub 145 is within tolerance.

In one embodiment, such an indication can be provided as a tape drive diagnostic metric in a consumer use environment of tape drive 100. This diagnostic metric allows a user, technician, monitoring computer, or other entity to monitor operating parameters of drive reel hub 145 and/or of a cartridge reel hub 115. This can provide an alert to an out of tolerance operating condition or to help diagnose a failure condition of tape drive 100.

Radii variation output 250 can provide a variety of information as an output from measurement module 150. Information which can be provided with respect to a drive reel includes: a maximum drive reel radius variation (and optionally a rotational degree of occurrence), a minimum drive reel radius variation (and optionally a rotational degree of occurrence), and a peak drive reel radius variation (and optionally a rotational degree of occurrence). In some embodiments, radii variation output 250 can also output drive reel related information including: average speed of a reel during tape speed data collection, average reel radius, number of revolutions of a reel from which tape speed data was collected, number of missing degrees in a once around of drive reel hub 145 that exist in the correlated tape speed data. Similar information related to a cartridge reel and cartridge reel hub can also be provided, in one embodiment. All, none, or various combinations of such information can be provided as an output which can, in various embodiment, be viewed on a display, printed, stored, processed, or electronically forwarded to another location or entity.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of electronically measuring reel off-center run-out and reel hub mismatch, said method comprising:
   accessing, by a processing device, electronically measured tape speed data related to a tape coupled with an operating drive reel;
   correlating, by said processing device, said tape speed data with drive reel rotation angles; and
   translating, by said processing device, correlated tape speed data to drive reel hub radii variations with respect to said drive reel rotation angles, wherein said drive reel hub radii variations comprise an operational measure of reel off-center run-out and reel hub mismatch of said drive reel, wherein said translating correlated tape speed data to drive reel hub radii variations with respect to said drive reel rotation angles comprises:
   fitting, by said processing device, a sine wave to a set of data comprising average tape speed data which has been correlated with said drive reel rotation angles; and
   subtracting, by said processing device, amplitude information of said fitted sine wave from elements of said set of data to translate said tape speed data to drive reel hub radii variations with respect to said drive reel rotation angles.

2. The method as recited in claim 1, further comprising:
   determining, by said processing device, if a drive reel hub radius variation of said drive reel hub radii variations complies with a specified radius variation tolerance.

3. The method as recited in claim 2, further comprising:
   providing, by said processing device, an indication if said drive reel hub radius variation is out of compliance with said specified radius variation tolerance.

4. The method as recited in claim 3, wherein said providing an indication if said drive reel hub radius variation is out of compliance with said specified radius variation tolerance comprises:
   providing said indication as a measure of quality control in manufacture of a tape drive which comprises said drive reel.

5. The method as recited in claim 3, wherein said providing an indication if said drive reel hub radius variation is out of compliance with said specified radius variation tolerance comprises:
   providing said indication as a tape drive diagnostic metric in a consumer use environment of a tape drive which comprises said drive reel.

6. The method as recited in claim 1, wherein said accessing electronically measured tape speed data related to a tape coupled with an operating drive reel comprises:
   electronically measuring time between position error signal markings on said tape.

7. The method as recited in claim 1, wherein said correlating said tape speed data with drive reel rotation angles comprises:
   determining a rotation angle of a drive reel position at a time of measurement of a tape speed of said tape speed data; and
   correlating said tape speed with said rotation angle.

8. The method as recited in claim 1, wherein said fitting a sine wave to a set of data comprises:
   utilizing a Fourier transform to fit said sine wave to said set of data.

9. A non-transitory computer-readable medium having computer-executable instructions, which, when executed by one or more processors, causes the one or more processors to perform a method of electronically measuring operational circularity of a reel hub, said method comprising:
   accessing electronically measured tape speed data related to a tape coupled with an operating drive reel;
   correlating said tape speed data with reel rotation angles of a reel; and
   translating correlated tape speed data to reel hub radii variations with respect to said reel rotation angles, wherein said reel hub radii variations comprise a measure of operational circularity of said reel hub, wherein said translating correlated tape speed data to reel hub radii variations with respect to said reel rotation angles comprises;
   fitting a sine wave to a set of data comprising average tape speed data which has been correlated with reel rotation angles; and
   subtracting said sine wave to translate said tape speed data to reel hub radii variations with respect to said reel rotation angles.

10. The non-transitory computer-readable medium claim 9, further comprising computer-executable instructions for:
    providing information related to said reel hub radii variations.

11. The non-transitory computer-readable medium of claim 10, wherein said providing information related to said reel hub radii variations comprises:
    providing information selected from the list of information consisting of: a maximum reel radius variation, a minimum reel radius variation, and a peak reel radius variation.

12. The non-transitory computer-readable medium of claim 10, wherein said providing information related to said reel hub radii variations comprises:
    providing an indication if a reel hub is out of compliance with a pre-specified radius tolerance.

13. The non-transitory computer-readable medium of claim 9, wherein said electronically measuring tape speed data related to a tape coupled with an operating drive reel comprises:
    electronically measuring tape speed data during reverse tape motion near beginning of tape (BOT).

14. The non-transitory computer-readable medium of claim 9, wherein said correlating said tape speed data with reel rotation angles comprises:
- determining a rotation angle of a reel position at a time of measurement of a tape speed of said tape speed data; and
- correlating said tape speed with said rotation angle.

15. The non-transitory computer-readable medium of claim 9, wherein said fitting a sine wave to a set of data comprising tape speed data which has been correlated with reel rotation angles comprises:
- utilizing a Fourier transform to fit said sine wave to said set of data.

16. A tape drive comprising:
- a head;
- a drive reel configured for engaging a tape and, during operation, rotatably spooling said tape such that said tape passes longitudinally in proximity to said head; and
- a measurement module communicatively coupled with said head and said drive reel, and configured for electronically measuring operational circularity of a drive reel hub of said drive reel, said measurement module comprising:
   - a tape speed accessor configured for accessing electronically measured tape speed data related to said tape during said operation of said drive reel;
   - a rotation angle correlator configured for correlating said tape speed data with drive reel rotation angles; and
   - a hub radius translator configured for translating correlated tape speed data to drive reel hub radii variations with respect to said drive reel rotation angles, wherein said drive reel hub radii variations comprise a measure of operational circularity of said drive reel hub, wherein
   said hub radius translator is further configured for fitting a sine wave to a set of data comprising average tape speed data which has been correlated with said drive reel rotation angles; and for subtracting amplitude information of said fitted sine wave from elements of said set of data to translate said tape speed data to drive reel hub radii variations with respect to said drive reel rotation angles.

17. The tape drive of claim 16, wherein said measurement module further comprises:
- a tolerance determiner configured for determining if a drive reel hub radius variation of said drive reel hub radii variations complies with a specified radius variation tolerance.

18. The tape drive of claim 16, wherein said measurement module further comprises:
- a radii variation output configured for outputting information related to said drive reel hub radii variations.

\* \* \* \* \*